US009516589B2

(12) United States Patent
Ansari et al.

(10) Patent No.: US 9,516,589 B2
(45) Date of Patent: Dec. 6, 2016

(54) TRADING SPECTRUM FOR ENERGY SAVINGS IN GREEN COGNITIVE CELLULAR NETWORKS

(71) Applicant: New Jersey Institute of Technology, Newark, NJ (US)

(72) Inventors: Nirwan Ansari, Montville, NJ (US); Tao Han, North Arlington, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 418 days.

(21) Appl. No.: 14/110,708

(22) PCT Filed: Apr. 1, 2013

(86) PCT No.: PCT/US2013/034848
§ 371 (c)(1),
(2) Date: Oct. 8, 2013

(87) PCT Pub. No.: WO2014/163614
PCT Pub. Date: Oct. 9, 2014

(65) Prior Publication Data
US 2014/0313956 A1    Oct. 23, 2014

(51) Int. Cl.
*H04W 52/02* (2009.01)
(52) U.S. Cl.
CPC ........... *H04W 52/0206* (2013.01); *Y02B 60/50* (2013.01)
(58) Field of Classification Search
CPC ........... H04W 52/0216; H04W 76/048; H04W 52/0209; H04W 52/0235; Y02B 60/50
(Continued)

(56) References Cited

U.S. PATENT DOCUMENTS

2003/0064744 A1* 4/2003 Zhang ................... H04W 52/20
  455/522
2007/0243873 A1* 10/2007 Jin ......................... H04W 36/06
  455/436
(Continued)

OTHER PUBLICATIONS

De Brito, G.S., "Evolution of land mobile radio (including personal) ccommunications: Cost 231," 2nd International Conference on Universal Personal Communications, Personal Communications: Gateway to the 21st Century. Conference Record, vol. 2, pp. 560-564, Oct. 12-15, 1993.

(Continued)

Primary Examiner — Andrew Chriss
Assistant Examiner — Atique Ahmed
(74) Attorney, Agent, or Firm — Turk IP Law, LLC

(57) ABSTRACT

Technologies are generally described for reducing overall power consumption of a wireless network such as a cellular network through spectrum trading. According to some examples, spectrum may be shared between primary base stations (PBSs) and secondary base stations (SBSs) to reduce a power consumption of PBSs and increase the spectral efficiency of cellular networks. A PBS may share a portion of its licensed bandwidth with SBSs, to provide data services to primary users (PUs) within SBSs' coverage area. Due to their proximity to the PUs, the SBSs may satisfy the PUs' quality of service (QoS) requirements by utilizing a portion of the allocated bandwidth. Thus, PBSs may reduce their power consumption by offloading some of the PUs to SBSs. Because the SBSs typically use lower power compared to the PBS, the overall power consumption of the network may be reduced as well.

23 Claims, 6 Drawing Sheets

(58) Field of Classification Search
USPC .......... 370/311, 329; 455/452.2, 438, 435.1
See application file for complete search history.

(56) References Cited

U.S. PATENT DOCUMENTS

| | | | | |
|---|---|---|---|---|
| 2007/0248048 | A1* | 10/2007 | Zhu | H04W 72/1242 370/329 |
| 2010/0246506 | A1* | 9/2010 | Krishnaswamy ... | H04W 72/085 370/329 |
| 2011/0044284 | A1* | 2/2011 | Voltolina | H04W 24/02 370/331 |
| 2012/0094665 | A1* | 4/2012 | Soliman | H04W 48/16 455/435.1 |
| 2012/0120887 | A1* | 5/2012 | Deaton | H04W 16/14 370/329 |
| 2012/0307744 | A1* | 12/2012 | Charbit | H04W 72/1205 370/329 |
| 2012/0307750 | A1 | 12/2012 | Hunukumbure et al. | |
| 2013/0072197 | A1* | 3/2013 | Tenneti | H04W 92/02 455/438 |
| 2013/0100933 | A1* | 4/2013 | Kim | H04W 52/367 370/335 |
| 2013/0142133 | A1* | 6/2013 | Pedersen | H04W 16/10 370/329 |
| 2014/0024388 | A1* | 1/2014 | Earnshaw | H04L 5/0073 455/452.2 |

OTHER PUBLICATIONS

"Femtocell", http://en.wikipedia.org/wiki/Femtocell, First created on Nov. 3, 2006.
"Microcell", http://en.wikipedia.org/wiki/Microcell, First created on Sep. 17, 2004.
"Picocell", http://en.wikipedia.org/wiki/Picocell, First created on Feb. 13, 2006.
Arnold et al., "Power consumption modeling of different base station types in heterogeneous cellular networks", Future Network and Mobile Summit, 2010, Conference on Jun. 16-18, 2010.
Bhaumik et al, "Breathe to stay cool: adjusting cell sizes to reduce energy consumption", in Proceedings of the first ACM SIGCOMM workshop on Green networking, New Delhi, India, Aug. 2010.
Correia et al., "Challenges and enabling technologies for energy aware mobile radio networks," Communications Magazine, IEEE, vol. 48, No. 11, pp. 66-72, Nov. 2010.
"Sustainable energy use in mobile communications", Created by Ericsson Inc. on Aug. 21, 2007.
Etoh et al, "Energy consumption issues on mobile network systems", in Applications and the Internet, 2008. Saint 2008. International Symposium on Applications and the Internet, Turku, Finland, on Jul. 28-Aug. 1, 2008.
Brito, "Evolution of land mobile radio (including personal) Communications: Cost 231",Universal Personal Communications, 1993.
Personal Communications: Gateway to the 21st Century. Conference Record, 2nd International Conference on Oct. 12-15, 1993.
Han et al, "ICE: Intelligent cell breathing to optimize the utilization of green energy", Communications Letters, IEEE, vol. 16, Jun. 2012.
Han et al., "On Greening Cellular Networks via Multicell Cooperation", In: IEEE Wireless Communications vol. 20, Issue1, especially pp. 1-7, Feb. 2013.
Han, "Energy efficient wireless multicasting", Communications Letters, IEEE, vol. 15, No. 6, pp. 620-622, Jun. 2011.
Irmer et al, "Coordinated multipoint: Concepts, performance, and field trial results", Communications Magazine, IEEE, vol. 49, No. 2, pp. 102-111, Feb. 2011.
Saruthirathanaworakun et al., "Dynamic Primary-Secondary Spectrum Sharing with Cellular Systems", Cognitive Radio Oriented Wireless Networks & Communications (CROWNCOM), 2010 Proceedings of the Fifth International Conference on Jun. 9-11, 2010.
Peha, "Sharing Spectrum through Spectrum Policy Reform and Cognitive Radio", Final version will appear in Proceedings of the IEEE special issue on Cognitive Radio, Published on 2009.
Luah et al., "A Nash-based Power Control Game for Green Communications via Cognitive Radio Networks", In: 2012 IEEE Conference on Sustainable Utilization and Development in Engineering and Technology, Kuala Lumpur, Malaysia, especially pp. 164-166, Conference on Oct. 6-9, 2012.
Oh et al, "Energy savings through dynamic base station switching in cellular wireless access networks", in Global Telecommunications Conference (GLOBECOM 2010), 2010 IEEE, pp. 1-5, Conference on Dec. 6-10, 2010.
Samdanis et al,"Dynamic energy-aware network re-configuration for cellular urban infrastructures", in GLOBE-COM Workshops (GC Workshops), 2010 IEEE, Miami, FL, USA, on Dec. 6-10, 2010.
Lee et al, "Joint Spectrum and Power Allocation for Inter-Cell Spectrum Sharing in Cognitive Radio Networks", Published on New Frontiers in Dynamic Spectrum Access Networks, DySPAN 2008. 3rd IEEE Symposium on, Conference on Oct. 14-17, 2008.
Zhou et al, "Green mobile access network with dynamic base station energy saving", in Proc of ACM MobiCom, Beijing, China, Sep. 20-25, 2009.
Zhou et al, "Energy Source Aware Target Cell Selection and Coverage Optimization for Power Saving in Cellular Networks", Green Computing and Communications (GreenCom), 2010 IEEE/ ACM Int'l Conference on & Int'l Conference on Cyber, Physical and Social Computing (CPSCom), Conference on Dec. 18-20, 2010.
Han et al, "Trading Spectrum for Energy Savings in Green Cognitive Cellular Networks" Accepted by Proceedings of IEEE International Conference on Communications, Budapest, Hungary, Jun. 2013.
"3gpp R3-100162: Overview to LTE energy saving solutions to cell switch off/on," in 3GPP RAN3 Meeting, Valencia, Spain, Jan. 18-22, 2010.
International Search Report and Written Opinion for PCT/US13/ 34848, filed Apr. 1, 2013 mailed Jul. 12, 2013.

* cited by examiner

COMPUTER PROGRAM PRODUCT 600

SIGNAL BEARING MEDIUM 602

604 AT LEAST ONE OF

ONE OR MORE INSTRUCTIONS FOR CATEGORIZING PUs;
    ONE OR MORE INSTRUCTIONS FOR DETERMINING PUs WITH NOT YET ASSOCIATED WITH PBS OR SBS;
    ONE OR MORE INSTRUCTIONS FOR DERIVING PU POWER-BANDWIDTH RATIO BY DIVIDING PBS TRANSMISSION POWER FOR PU BY SBS BANDWIDTH NEED FOR PU;
    ONE OR MORE INSTRUCTIONS FOR IF POWER CONSUMPTION OF PBS IS REDUCED ASSOCIATING PU WITH A SBS;
    ONE OR MORE INSTRUCTIONS FOR IF POWER CONSUMPTION OF PBS IS NOT REDUCED ASSOCIATING PU WITH PBS; AND
    ONE OR MORE INSTRUCTIONS FOR SWITCHING TO ANOTHER PU.

| COMPUTER-READABLE MEDIUM 606 | RECORDABLE MEDIUM 608 | COMMUNICATIONS MEDIUM 610 |
|---|---|---|

FIG. 6

TRADING SPECTRUM FOR ENERGY SAVINGS IN GREEN COGNITIVE CELLULAR NETWORKS

STATEMENT REGARDING FEDERALLY SPONSORED RESEARCH OR DEVELOPMENT

This invention was made with government support under grants CNS-1147602 awarded by the National Science Foundation. The government has certain rights in the invention.

CROSS-REFERENCE TO RELATED APPLICATION

This application is the U.S. National Stage filing under 35 U.S.C. §371 of International Application No. PCT/US 2013/34848 filed on Apr. 1, 2013. The International Application is hereby incorporated by reference in its entirety.

BACKGROUND

Unless otherwise indicated herein, the materials described in this section are not prior art to the claims in this application and are not admitted to be prior art by inclusion in this section.

In wireless cellular networks, energy consumption is mainly drawn from base stations (BSs). According to the power consumption breakdown, BSs may consume more than half of the power of a cellular network. As the number of BSs increases along with expanded coverage and networks of competing service providers, reducing the power consumption of BSs may be a desirable goal for small carbon footprint cellular networks. Designing energy efficient base stations to reduce the energy consumption of cellular networks is one approach pursued by service providers.

Efforts on making cellular networks more "green" (i.e., environmentally friendly through increased use of renewable energy and reduced use of fossil-based energy) may further include designing power saving communication protocols that adjust the transmit power of the transceivers according to the traffic intensity as an approach. A further approach may include designing heterogeneous radio access networks which may utilize a diverse set of base stations to improve spectral and energy efficiency per unit area. Yet another approach may include designing off-grid BSs and communication protocols to enable utilization of renewable energy in cellular access networks. Renewable energy such as sustainable biofuels, solar, and wind energy are promising options for reducing the from-power-grid energy consumed by BSs and reducing the carbon footprint of cellular networks.

SUMMARY

The present disclosure generally describes a green-cognitive cellular network architecture and an operation and management scheme to improve an energy efficiency as well as a spectral efficiency of cellular networks.

According to some examples, a method for reducing power consumption in cellular communication networks through spectrum trading is described. An example method may include determining a group of primary users (PUs) that are not associated with a primary base station (PBS) or a secondary base station (SBS); determining a power-bandwidth ratio for one of the PUs within the group by dividing a PBS transmission power needed to serve the PU by a bandwidth needed by a SBS to serve the PU; determining whether a power consumption of the PBS is reduced by having the PU associated with the SBS based on the power-bandwidth ratio; and if the power consumption is reduced associating the PU with the SBS, else associating the PU with the PBS.

According to other examples, a controller for a cellular communication network that reduces power consumption in the cellular communication network through spectrum trading is described. The controller may include a communication module configured to communicate with a plurality of primary base stations (PBSs) and secondary base stations (SBSs) and a power management module. The power management module may be configured to determine a group of primary users (PUs) that are not associated with a PBS or a SBS; determine a power-bandwidth ratio for one of the PUs within the group by dividing a PBS transmission power needed to serve the PU by a bandwidth needed by a SBS to serve the PU; determine whether a power consumption of the PBS is reduced by having the PU associated with the SBS based on the power-bandwidth ratio; if the power consumption is reduced, associate the PU with the SBS, else associate the PU with the PBS; and iteratively determine the power-bandwidth ratio for each PU within the group and associate each PU with one of the PBS and the SBS.

According to further examples, a cellular-structured wireless communication network capable of reducing power consumption in the cellular communication network through spectrum trading is described. The network may include a plurality of primary base stations (PBSs) and secondary base stations (SBSs) and a controller managing communication and power management operations of the base stations. The controller may be configured to determine a group of primary users (PUs) that are not associated with a PBS or a SBS; determine a power-bandwidth ratio for one of the PUs within the group by dividing a PBS transmission power needed to serve the PU by a bandwidth needed by a SBS to serve the PU; determine whether a power consumption of the PBS is reduced by having the PU associated with the SBS based on the power-bandwidth ratio; if the power consumption is reduced, associate the PU with the SBS, else associate the PU with the PBS; and iteratively determine the power-bandwidth ratio for each PU within the group and associate each PU with one of the PBS and the SBS.

According to some examples a computer-readable storage medium with instructions stored thereon for reducing power consumption in cellular communication networks through spectrum trading is described. The instructions may cause a method to be performed when executed, the method being similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 illustrates a block diagram of an example computer program product for implementing spectrum trading using cognitive radio techniques for energy savings in green-cognitive cellular networks, all arranged in accordance with at least some embodiments described herein.

DETAILED DESCRIPTION

Figure 1:
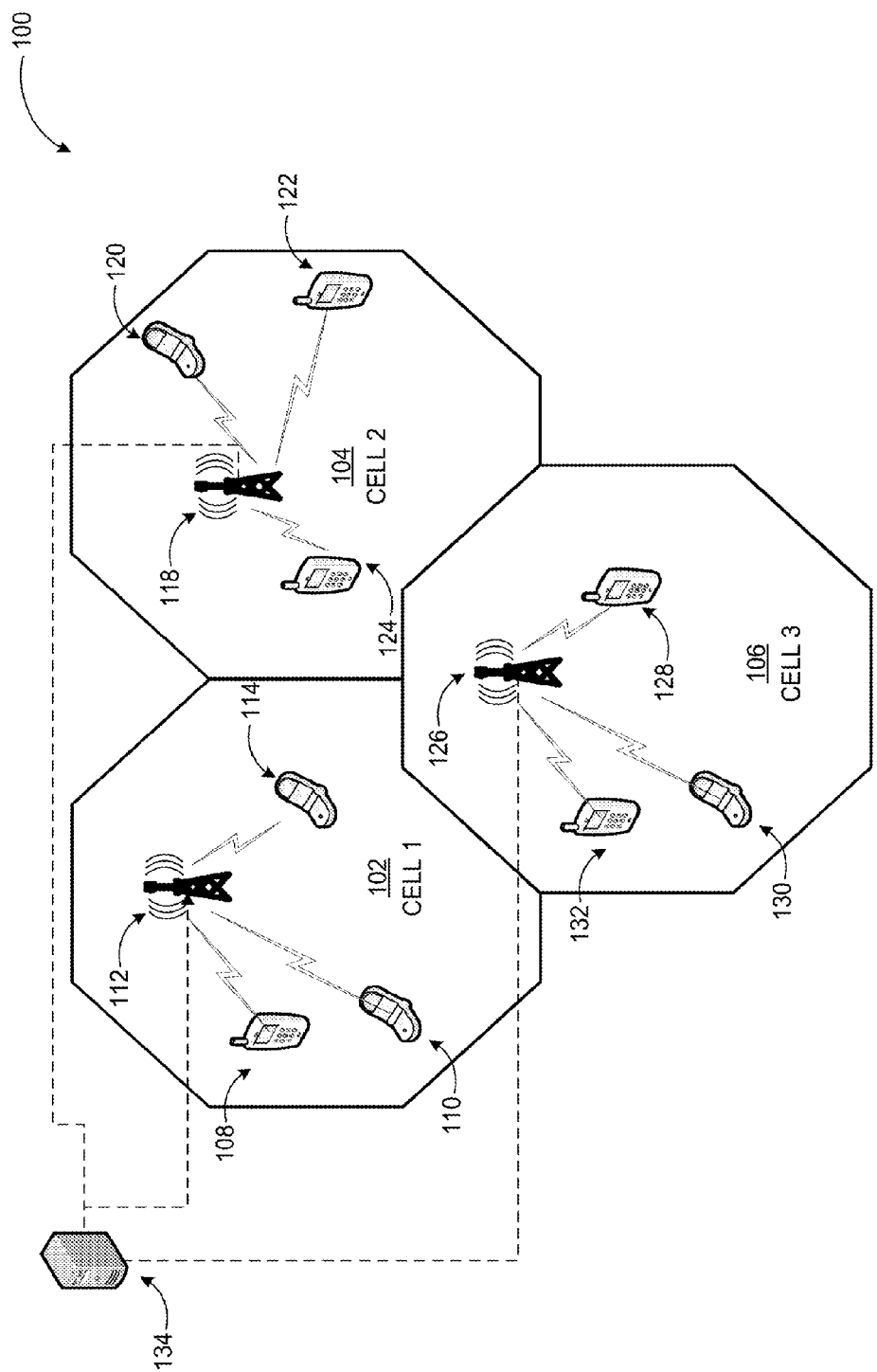
FIG. 1 is a diagram of an illustrative example cellular communication system, where spectrum may be traded using cognitive radio techniques for energy savings in green-cognitive cellular networks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to trading spectrum using cognitive radio techniques for energy savings in green-cognitive cellular networks.

Briefly stated, technologies are generally described for reducing overall power consumption of a wireless network such as a cellular network through spectrum trading. According to some examples, spectrum may be shared between primary base stations (PBSs) and secondary base stations (SBSs) to reduce a power consumption of PBSs and increase the spectral efficiency of cellular networks. A PBS may share a portion of its licensed bandwidth with SBSs, to provide data services to primary users (PUs) within SBSs' coverage area. Due to their proximity to the PUs, the SBSs may satisfy the PUs' quality of service (QoS) requirements by utilizing a portion of the allocated bandwidth. Thus, PBSs may reduce their power consumption by offloading some of the PUs to SBSs. Because the SBSs typically use lower power compared to the PBS, the overall power consumption of the network may be reduced as well.

FIG. 1 is a diagram of an illustrative example cellular communication system, where spectrum may be traded using cognitive radio techniques for energy savings in green-cognitive cellular networks use, arranged in accordance with at least some embodiments described herein.

Diagram 100 shows three example cells 102, 104, and 106, with their respective base stations 112, 118, and 126. Each bases station may communicate with a variety of user devices in their respective cells such as base station 112 communicating with smartphone 108 and cellular phones 110, 114; base station 118 communicating with smartphones 122 and 124, and cellular phone 120; and base station 126 communicating with smartphones 128 and 132, and cellular phone 130.

Network communications for control and data exchange may take place over a different communications network between the base stations and a controller such as controller 134. The base stations in a wireless (e.g., cellular) network, also referred to as "tower" are typically powered by the traditional power grid, which distributes electric power based on fossil-based or hydroelectric generation mechanisms. Increasingly, base stations may be equipped with on-location power generation systems such as solar or wind-based power generation. Furthermore, the power grids are also providing an increasing portion of their power from renewable energy sources such as solar, wind, bio-mass, etc. Still, energy consumption in cellular networks is mainly drawn from base stations, which may consume more than 50 percent of the power of a cellular network.

In a system according to some embodiments, a green-cognitive cellular network architecture may enable spectrum sharing between primary base stations (PBSs) and secondary base station (SBSs) to reduce the power consumption of PBSs and increase the spectral efficiency of cellular networks by taking advantage of cognitive radio techniques. In cognitive cellular networks, a PBS may be a macro/micro BS which owns the spectrum and provides data services to primary users (PUs) within a large area. The SBS may be a radio access point aiming to provide data services to secondary users (SUs) within its coverage area via either the unlicensed spectrum or the licensed spectrum.

The PBS may have the exclusive access to the licensed band. However, due to the wireless channel fading between the PBS and PUs, providing high data rates to the PUs, especially to those located at the cell edge, may be both bandwidth and power consuming. As compared with the PBS, the SBSs, which are typically in closer proximity to the PUs may experience less wireless channel fading and have higher spectral and energy efficiency on providing data services to the PUs.

Due to the open format, the unlicensed spectrum may become increasingly crowded, and the quality of service (QoS) of data services on unlicensed band may not be guaranteed. A power-spectrum trading (PST) scheme for green cognitive cellular networks according to some embodiments may exploit the merits of both the PBS and SBSs. In the PST scheme, the PBS may share a portion of the licensed bandwidth with SBSs, while SBSs provide data services to PUs within their coverage area using the allocated bandwidth. Since the SBSs are closer to the PUs, the SBSs may satisfy PUs' QoS requirements by utilizing a portion of the allocated bandwidth. The residual bandwidth may then be utilized to fulfill SUs' data needs. Thus, a PST scheme according to embodiments may enable the PBS to reduce its power consumption by offloading some of the PUs to SBSs, and allow the SBSs to enhance their data rates or QoS to SUs by utilizing the licensed bandwidth.

Because the SBSs usually have lower transmission power compared to the PBS, the power consumption of cellular networks on providing data services to PUs may be reduced. Therefore, a green-cognitive cellular network using the PST scheme according to some embodiments may enhance the energy efficiency and/or the spectral efficiency of cellular networks. In order to minimize the power consumption, the PBS may need to maximize the number of users offloaded to SBSs. Meanwhile, the PBS may aim to minimize an amount of bandwidth allocated to individual SBSs because the less bandwidth allocated to individual SBSs, the more bandwidth is reserved for the PUs associated with the PBS, and therefore the PBS consumes less power. On the other hand, the PBS may need to provide the SBSs with sufficient incentives in terms of bandwidth to incentivize the SBSs to provide data services to the PUs.

Thus, the optimal network operation strategy may involve determining user-BS associations and bandwidth allocations to minimize the power consumption of the PBSs while satisfying the bandwidth requirements of SBSs. Minimizing the PBS's power consumption in green-cognitive cellular networks using the PST scheme may be approached as an NP-hard problem. While an optimal solution to the NP-hard problem may be computed, the algorithm may be computationally inefficient. According to some embodiments, a heuristic technique is proposed to approximate the optimal solution. The heuristic technique may first determine the PUs whose user-BS associations are not determined, and then iteratively associate the PUs with a largest power-bandwidth ratio with SBSs. A PU's power-bandwidth ratio may be derived by dividing the PBS's transmission power on the PU by the SBS's bandwidth need for providing data services to the PU. If the power consumption of the PBS is reduced, the PU may be associated with SBSs; else, the PU may be associated with the PBS. The heuristic technique may achieve 50% or higher power consumption reduction of that of the optimal solution.

Figure 2:
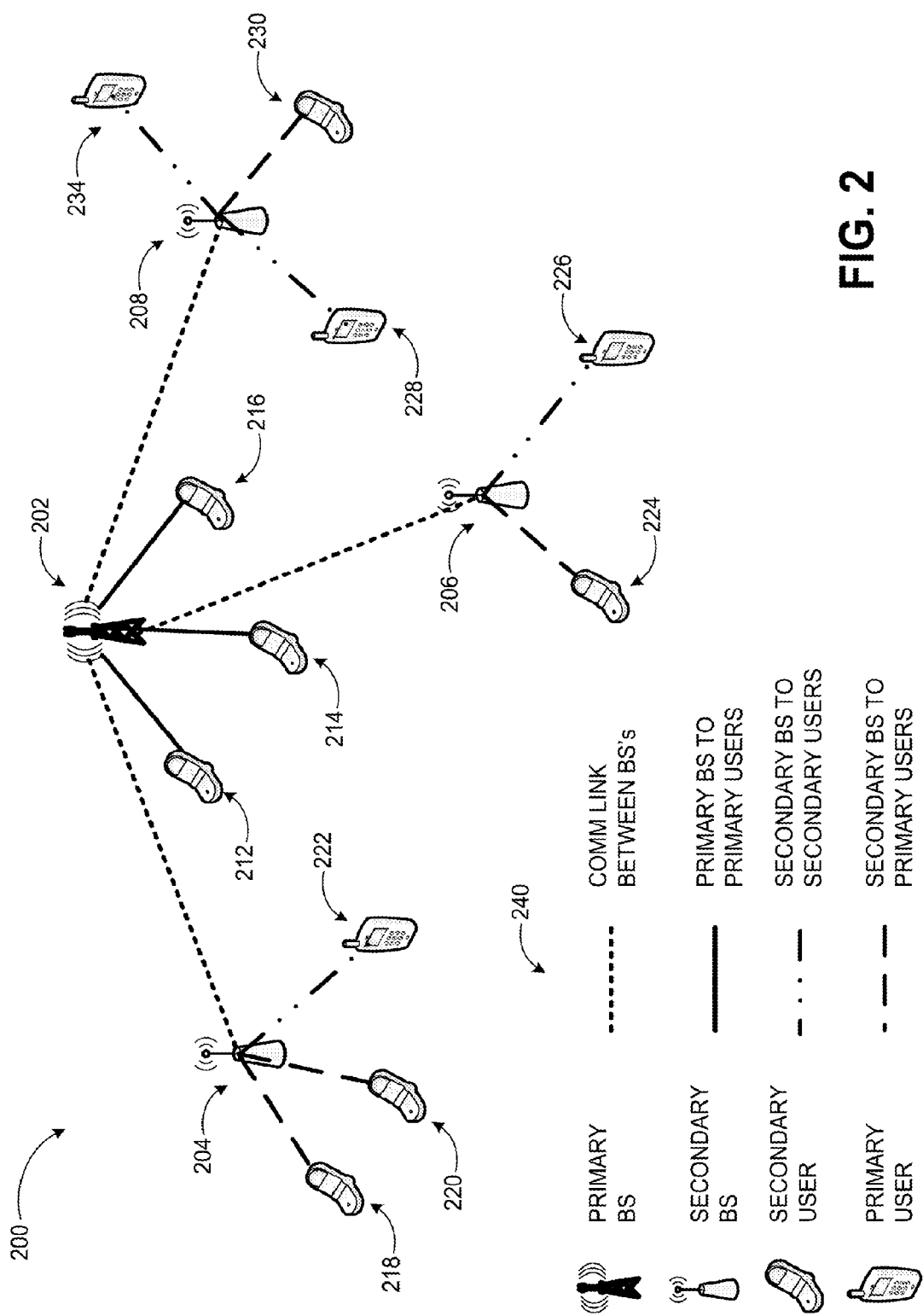
FIG. 2 illustrates an example power/spectrum trading scheme in a cellular network.

FIG. 2 shows an example power/spectrum trading scheme in a cellular network, arranged in accordance with at least some embodiments described herein.

Diagram 200 shows a cell of a cellular wireless network serviced by a PBS 202. Three example SBSs 204, 206, and 208 are provided as illustrative examples of a plurality of SBSs that may communicate with the PBS 202 and facilitate wireless communication with user devices in their vicinity. Thus, in addition to communicating with PUs 212, 214, and 216 within its vicinity, the PBS 202 may maintain communication links with SBSs 204, 206, and 208. Based allocated frequency bandwidth by the PBS 202, SBS 204 may provide communication services to PUs 218 and 220 in its vicinity. SBS 204 may use any residual bandwidth to provide communication services to SU 222, which otherwise would use unlicensed band. Similarly, SBS 206 may provide communication services to PU 224 and SU 226. SBS 208 may provide communication services using its allocated bandwidth to PU 230 and using residual bandwidth to SUs 228 and 234. A legend 240 for the elements of diagram 200 is also provided in the figure.

In cellular networks, the total spectrum is usually divided into multiple channels, which may be allocated to the users to fulfill their QoS needs. Each channel may be allocated to an individual PU as needed. The amount of bandwidth allocated in each channel may be optimized to minimize the PBS's power consumption. For simplicity, an assumption may be made that both PUs and SUs experience frequency flat fading. The time may be assumed to be divided into time slots of duration T. Users' locations may be assumed to be static during one time slot. Further, the channel fading may be assumed to change slowly and considered as a constant within a time slot. Therefore, the wireless channel may be modeled as a slow-fading channel, which reflects the large-scale fading between BSs and users. $r_i^{min}$ may $w_i$ be denoted as PU i's data rate need and bandwidth need in associating with the PBS. Since there may exist a SBS k, which is closer to PU i, PU i, in association with SBS k, may need less bandwidth than $w_i$ to satisfy the data rate need. Thus, given the amount of bandwidth $w_i$, if PU i is associated with SBS k, a portion of bandwidth may be underutilized. SBS k may be able to exploit the underutilized spectrum for data transmission for SUs.

The PBS's power consumption may include two parts: the static power consumption and the dynamic power consumption. The static power consumption is the power consumption of a BS without any traffic load. The dynamic power consumption refers to the additional power consumption caused by traffic load on the BS. The focus of a system according to embodiments is on reducing the dynamic power consumption of a PBS by offloading its traffic to SBSs. Thus, the PBS's power consumption may be modeled as a summation of the PBS's transmission power toward the PUs that are associated with the PBS. As discussed above, the PBS may provide data service to the PUs within its coverage area via licensed spectrum. SBSs may be randomly located in the area and aim to opportunistically utilize the licensed spectrum to transmit data to SUs. The PUs within SBSs' coverage area may be associated with either the PBS or SBSs. Three centralized techniques for executing the PST scheme in green-cognitive cellular networks are presented herein. Symbols used in the example computations herein are listed in Table I below.

TABLE I

Summary of Symbols

| Symbol | Definition |
| --- | --- |
| $p_i$ | the PBS's transmission power to PU i |
| $p^{max}$ | the PBS's maximal transmission power |
| $p_i$ | the transmission power of SBS k to PU i |
| $p_k^{max}$ | the maximal transmission power of SBS k |
| W | the total amount of available bandwidth on the PBS |
| $w_i$ | the amount of bandwidth allocated to PU i by the PBS |
| $w_i$ | the amount of bandwidth allocated to SBS in serving PU i |
| $\hat{w}_{k,i}$ | the amount of bandwidth allocated to PU i by SBS k |
| $\overline{w}_{k,i}$ | the amount of bandwidth required by SBS k in serving PU i |
| $W^p$ | the amount of residual bandwidth available in the PBS |
| $\overline{w}_i^{max}$ | the maximal amount of bandwidth allocated to SBS who serves PU i |
| $\overline{w}_i^{min}$ | the minimal amount of bandwidth required for the PBS in serving PU i |
| $r_i^{min}$ | the minimum data rate requirement of PU i |
| $r_k^{min}$ | the minimum data rate requirement of SBS k in serving one PU |
| $r_{k,i}$ | the secondary data rate achieved by SBS k in serving PU i |
| U | the set of PUs |
| $U^p$ | the set of PUs who are associated with the PBS |
| $U^s$ | the set of PUs who are associated with SBS |
| $U^t$ | the set of PUs whose user-BS association is not determined |
| $U_k^s$ | the set of PUs who are associated with SBS k |
| S | the set of SBSs |
| $h_i$ | the fading coefficient between the PBS and PU i |
| $h_{k,i}$ | the fading coefficient between SBS k and PU i |
| $h_k$ | the fading coefficient between SBS k and its secondary user |
| $N_0$ | the channel noise density |

A centralized approach may assume that at the beginning of a given time slot the PBS calculates its transmission power to individual SUs, and SBSs calculate the minimum bandwidth needed to satisfy the data rate requirements of both PUs and the SUs under their coverage. Based on the calculation results and the channel fading coefficients between BSs (both PBS and SBSs) and PUs, the centralized approach may derive optimal user-BS associations and bandwidth allocations in terms of minimizing the PBS' power consumption. The centralized power minimization (CPM) may be expressed as follows:

$$\min \sum_{i \in U^P} p_i, \quad [1]$$

subject to:

$$\sum_{i \in U^P} w_i + \sum_{i \in U^S} \overline{w}_i \leq W, \quad [2]$$

$$r_i \geq r_i^{min}, \forall i \in U,$$

$$p_i \leq p^{max}, \forall i \in U^P,$$

$$\overline{p}_i \leq \overline{p}_k^{max}, \forall k \in S, \forall i \in U_k^s$$

$$\overline{r}_{k,i} \geq \overline{r}_k^{min}, \forall k \in S, \forall i \in U_k^s.$$

Here, $\bar{r}_{k,j}$ is the secondary data rate (SDR) achieved by SBS k in serving PU i, and may be expressed as:

$$\bar{r}_{k,i} = (\overline{w}_i - \hat{w}_{k,i}) \log\left(1 + \frac{\overline{p}_i |\overline{h}_k|^2}{N_0(\overline{w}_i - \hat{w}_{k,i})}\right). \quad [3]$$

In equation [3], $\hat{w}_{k,i}$ is the amount of bandwidth needed by SBS k to satisfy PU i's data rate needs, and may be derived from:

$$r_i = \hat{w}_{k,i} \log\left(1 + \frac{\overline{p}_i |\overline{h}_{k,i}|^2}{N_0 \hat{w}_{k,i}}\right). \quad [4]$$

According to the Shannon-Hartley theorem, given the channel fading coefficient $h_i$, the transmission power $p_i$ is a function of the bandwidth allocation $w_i$ and the data rate $r_i$, and may be expressed as:

$$p_i = \frac{N_0 w_i \left(2^{\frac{r_i}{w_i}} - 1\right)}{|h_i|^2}. \quad [5]$$

The derivative of $p_i$ with respect to $w_i$ is:

$$\frac{\partial p_i}{\partial w_i} = -\frac{N_0 r_i 2^{r_i/w_i} \ln 2}{w_i |h_i|^2}. \quad [6]$$

Because $w_i > 0$ and $$r_i > 0, \frac{\partial p_i}{\partial w_i} < 0.$$

Therefore, for a given a data rate $r_i$, the larger the $w_i$, the smaller the $p_i$, and vice versa. Thus, to minimize the power consumption of the PBS, the amount of bandwidth reserved for PUs associated with the PBS may be maximized. Because the total amount of bandwidth has a predefined value, the amount of bandwidth allocated to SBSs may be minimized. In order to minimize the amount of bandwidth needed to meet data rate needs of both PUs and SUs, SBSs may have to transmit data with their maximal transmission power. According to Equation [3], given $\bar{r}_{k,i} > 0$, $\overline{w}_i > w_{k,i}$, the derivative of $\bar{r}_{k,i}$ with respect to $\overline{w}_i - \hat{w}_{k,i}$ is:

$$\frac{\partial \bar{r}_{k,i}}{\partial (\overline{w}_i - \hat{w}_{k,i})} > 0, k \in S, i \in U_k^s. \quad [7]$$

Therefore, with a fixed transmission power, a larger data rate may involve a larger amount of bandwidth. To minimize the amount of bandwidth needed by SBSs, the SDRs may be substantially equal to the minimum needed SDR on individual SBSs. In this way, the amount of bandwidth allocated to SBSs may be minimized while SBSs still have incentives to cooperate with the PBS. Given the amount of bandwidth, the derivative of $p_i$ with respect to $r_i$ may be expressed as:

$$\frac{\partial p_i}{\partial r_i} = \frac{N_0 2^{r_i/w_i} \ln 2}{|h_i|^2} \quad [8]$$

Because $$\frac{\partial p_i}{\partial r_i} > 0,$$

given the amount of bandwidth, the power consumption may increase as the data rate increases. Therefore, to minimize the PBS's energy consumption, PUs may also be served at the minimum data rate.

Based on the above analysis, the CPM may be simplified as:

$$\min \sum_{i \in U^P} p_i \quad [9]$$

subject to:

$$\sum_{i \in U^P} w_i + \sum_{i \in U^S} \overline{w}_i \leq W, \quad [10]$$

$$w_i \geq w_i^{min}, \forall i \in U^P,$$

$$\overline{w}_i = \overline{w}_i^{min}, \forall i \in U^s.$$

Above, $\overline{w}_i^{min} = \min_{k \in S} \overline{w}_{k,i}$ and $w_i^{min}$ may be derived by solving the following equation:

$$r_i^{min} = w_i^{min} \log\left(1 + \frac{p^{max} |h_i|^2}{N_0 w_i^{min}}\right). \quad [11]$$

Assuming PU i is associated with SBS k, then $w_i^{min}$ may be derived by solving the following equation array:

$$\begin{cases} r_i^{min} = \hat{w}_{k,i} \log\left(1 + \frac{\overline{p}_k^{max}|h_{k,i}|^2}{N_0 \hat{w}_{k,i}}\right). \\ \overline{p}_k^{min} = (\overline{w}_i^{min} - \hat{w}_{k,i}) \log\left(1 + \frac{\overline{p}_k^{max}|\overline{h}_k|^2}{N_0(\overline{w}_i^{min} - \hat{w}_{k,i})}\right) \end{cases} \quad [12]$$

For the simplified CPM (SCPM), if user-BS associations are determined, the amount of bandwidth allocated to SBSs may be derived. Therefore, the amount of bandwidth available for PUs in associating with the PBS, $W^p$, may be calculated. With the knowledge of user-BS associations and $W^p$, the SCPM may be further reduced to a power consumption minimization (PCM) as follows:

$$\min \sum_{i \in U^p} p_i \quad [13]$$

subject to:

$$\sum_{i \in U^p} w_i \leq W^p, \quad [14]$$

$$w_i \geq w_i^{min}, \forall i \in U.$$

When $$w_i > 0, \frac{d^2 p_i}{d w_i^2} > 0.$$

Thus, $p_i$ may be a convex function of $w_i$. Therefore, the objective function may be convex. The constraints of the PCM may satisfy the Slater's conditions, and therefore the Karush-Kuhn-Tucher (KKT) conditions may provide necessary and sufficient conditions for the optimality of the PCM. Hence, optimal bandwidth allocations may be derived by solving the KKT conditions of the PCM. Thus, solving the SCPM may include two steps. The first step may be to determine the user-BS associations, and the second step may include solving the PCM. An optimal solution to the SCPM is described below followed by a heuristic technique to approximate the optimal solution.

A first issue in solving the SCPM is to determine the user-BS association. If $$\sum_{i \in U} \overline{w}_i^{min} \leq W,$$

all PUs may be associated with SBSs, and therefore the PBS may not have to provide data services to any PU and may be switched into the sleep mode to save energy. In this case, all PUs are associated with SBSs. Otherwise, user-BS associations may be determined to minimize the PBS's power consumption. The PUs may be classified into three categories according to their locations and data rate needs. The first category of PUs may pertain to the PUs that are associated with the PBS. For example, if PU i is out of the coverage area of all SBSs or $\overline{w}_i^{min} \geq W$, then PU i can only be associated with the PBS. The second category of PUs may involve the PUs that are associated with SBSs in order to achieve the optimal solution. For example, if $\overline{w}_i^{min} \leq w_i^{min}$, PU i may be associated with SBSs because by this association, PU i consumes less amount of bandwidth and zero power from the PBS. The third category of PUs may refer to the PUs whose user-BS associations are to be determined by the optimal solution computation. In this case, the PBS may spend zero power on the PUs who are associated with SBSs. However, the PBS may allocate more bandwidth to SBSs in order to incentivize them to provide data services to the PUs. This may result in a reduction of the amount of bandwidth allocated to the PUs who are associated with the PBS, and thus the overall power consumption on the PBS may increase. Therefore, the optimal solution computation may focus on determining user-BS associations for the third category of PUs.

A user filtering algorithm which classifies PUs into three user sets, $U^p$, $U^s$, and $U^t$, where each user set represents one category of the PUs as discussed above is shown below:

Algorithm 1 The User Filtering Algorithm

```
for i=1 to |U| do
    if w̄_i^min ≤ w_i^min then
        Assign PU i in the user set U^s;
    else if w_i^min < w̄_i^min < W then
        Assign PU i in the user set U^t;
    else
        Assign PU i in the user set U^p;
    end if
end for
Return U^p, U^s, and U^t.
```

The user-BS associations of PUs in both $U^p$ and $U^s$ may be determined from PU locations and data rate needs. The user-BS associations for the PUs in $U^t$ may be determined by the optimal solution computation, that solves the KKT conditions of the SCPM with every possible combination of the user-BS associations for PUs in the user set $U^t$ and finds a solution that minimizes the PBS's power consumption. An example optimal solution algorithm is shown below:

Algorithm 2 The Optimal Algorithm

```
Set all the primary users in U;
Calculate w_i^min and w̄_i^min ∀i ∈ U;
if Σ_{i∈U} w̄_i^min ≤ W then
    The minimal power consumption of primary BS is zero;
else
    (U^p, U^s, U^t) = User Filter Algorithm (w_i^min, w̄_i^min);
    Calculate KTT conditions of the optimization problem for 2^|U^t| possible associations;
end if
Return the optimal solutions.
```

The computation complexity of solving the KKT conditions of the PCM may be denoted as $O(|U|)$. The computation complexity of the optimal algorithm may then be defined as $O(|U|2^{|U^t|})$. When $|U^t|$ is large, the optimal algorithm may be computationally inefficient consuming large amounts of time and computational resources.

To address the computational inefficiency of the optimal solution computation, a heuristic technique may be employed to approximate the optimal solution according to some embodiments. Because $$\sum_{i \in U} \overline{w}_i^{min} > W,$$

not all the PUs can be associated with SBSs. The heuristic technique may associate the PUs, who contribute most power savings to the PBS, with SBSs. After executing the user-filtering algorithm, PUs are classified into three user sets. The PUs belonging to $U^p$ and $U^s$ are associated with the PBS and SBSs, respectively. The user-BS associations of PUs in $U^t$ are to be determined using the heuristic technique. Assuming the PUs belonging to $U^t$ are associated with the PBS, the amount of bandwidth, $\hat{w}_i$, allocated to PU i, $i \in U^t$ may be derived. For PU i, $i \in U^t$, if $\overline{w}_i^{min} \leq \hat{w}_i$, it indicates that associating PU i with SBSs does not need more bandwidth than associating the PU with the PBS. Meanwhile, associating PU i with SBSs may reduce the transmission power of the PBS. Therefore, PU i may be associated with SBSs.

For the PUs whose $\overline{w}_i^{min} > \hat{w}_i$, $i \in U^t$, if they are associated with SBSs, the PBS may save the transmission power by offloading them to SBSs. However, the PBS may have to allocate an additional amount of bandwidth to SBSs to incentivize the SBSs to provide data services to the PUs. This may reduce an amount of available bandwidth for the PUs who are associated with the PBS, and result in a power consumption increment on the PBS. Therefore, the PBS's power savings on associating individual PUs with SBSs may depend on two factors. The first one is the power consumption for serving individual PUs if they are associated with the PBS. The second one is the difference between the amount of bandwidth needed by SBSs in serving individual PUs and the amount of bandwidth allocated to individual PUs if they are associated with the PBS. The smaller the difference, the less power increments on the PBS for serving its associated PUs.

The ratio between the two factors described above may reflect the amount of potential power savings that can be achieved on the PBS. The larger the ratio, the more power savings may be achieved on the PBS. This ratio may be referred to as the power-bandwidth ratio (PBR). The heuristic technique may thus iteratively assign the PU with the largest PBR to SBSs until the user set $U^t$ is empty. At each iteration, if the user-BS association results in a power consumption reduction on the PBS, the PU may be assigned to $U^s$; otherwise, the PU may be assigned to $U^p$. At the beginning of each iteration, the heuristic technique may assume all the PUs in $U^t$ are associated with the PBS, and compute the PBS's total power consumption, $\theta^*$, its transmission power toward PU i, $\hat{p}_i$, and the bandwidth allocation, $\hat{w}_i$, $i \in U^t$.

With $$\tau_i = \frac{\hat{p}_i}{\overline{w}_i - \hat{w}^i}$$

be the PBR of PU i, the heuristic technique may determine the largest $\tau_i$, $i \in U^t$. Assuming k=arg max $\tau_i$, $i \in U^t$, the heuristic technique may associate PU k with SBSs, and compute the total power consumption of the PBS, $\theta^k$. If $\theta^k < \theta^*$ the algorithm may associate PU k with SBSs and update $\theta^*$; otherwise, PU k may be associated with the PBS. To ensure its performance, the heuristic technique, before the iterations, may associate PU k, k=arg max $\tau_i$, $i \in U^t$, with SBSs, and compute the total power consumption of the PBS, $\theta^{max}$. At the end, the technique may compare $\theta^{max}$ with $\theta^*$, and return the user-BS associations that achieve the minimum power consumption on the PBS. $\hat{w}'_i$ and $\hat{p}'_i$ may be assumed as the temporal bandwidth allocation and power consumption of PU i during the iterations. An example heuristic computation algorithm is provided below.

In the computation of PU associations, If $\tau_k > \tau_j$, i, $j \in U^t$, PU k's user-BS association does not depend on PU j's user-BS association. Furthermore, when $$\sum_{i \in U} \overline{w}_i^{min} \leq W,$$

both the heuristic technique and the optimal solution computation may achieve the same solution. This may be shown by: if $$\sum_{i \in U} \overline{w}_i^{min} \leq W,$$

then all the PUs may be associated with SBSs, and the PBS's power consumption is zero. For this scenario, both the heuristic technique and the optimal solution computation achieve the same solution.

When $$\sum_{i \in U} \overline{w}_i^{min} > W,$$

the maximal power consumption reduction achieved by the optimal solution computation may be at most twice of that achieved by the heuristic algorithm. If $$\sum_{i \in U} \overline{w}_i^{min} > W,$$

then not all the PUs may be associated with SBSs. Considering a relaxed problem where the PUs can be partially associated with SBSs, let $\pi_i$ denote the PBS's power consumption reduction when PU i is associated with SBSs, and $\overline{w}_i^{min}$ denote the bandwidth allocated to the SBS in serving PU i. If PU i is partially associated with the SBS, the PBS's power consumption reduction may be $\pi_i^p$ which is less than $\pi_i$, and the bandwidth needed by the SBS may be $\overline{w}_i^p$ which is also less than $\overline{w}_i^{min}$. Assuming (k−1) PUs may be associated with SBSs. Let the PBS's total power consumption reduction of the relaxation problem is $$\Pi^p = \sum_{i=1}^{i=k-1} \pi_i^p + \pi_k^p.$$

The optimal power consumption reduction of the original approach may be denoted as $\Pi^{opt}$. Although $\pi_i^p \leq \pi_i$, $\Pi^p \geq \Pi^{opt}$, let $\Pi^h$ be the PBS's power consumption reduction achieved by the heuristic technique on the original approach, and $$\Pi^h = \max\left(\sum_{i=1}^{i=k-1} \pi_i, \max_{i \in U^t} \pi_i\right) \geq \max\left(\sum_{i=1}^{i=k-1} \pi_i, \pi_k\right) \quad [15]$$

Because $\Pi^P \geq \Pi^{opt}$, $$\frac{\Pi^{opt}}{\Pi^h} \leq \frac{\sum_{i=1}^{i=k-1} \pi_i^P + \pi_k^P}{\max\left(\sum_{i=1}^{i=k-1} \pi_i, \pi_k\right)} \leq \frac{\sum_{i=1}^{i=k-1} \pi_i + \pi_k}{\max\left(\sum_{i=1}^{i=k-1} \pi_i, \pi_k\right)} \leq 2. \quad [16]$$

An example heuristic algorithm is shown below:

---
Algorithm 3 The Heuristic Algorithm
---

Set all primary users in U;
Calculate $\overline{w}_i^{min}$ and $w_i^{min}$, $\forall i \in U$;
if $\Sigma_{i \in U} \overline{w}_i^{min} \leq W$ then
   $\theta^* = 0$, and all PUs are associated with SBSs;
else
   $(U^p, U^s, U^t)$ = User Filter Algorithm $(\overline{w}_i^{min}, w_i^{min})$;
   Calculate $\theta^*$, $\hat{w}_i$, and $\hat{p}_i$ by solving the PCM problem with $U^p = U^p \cup U^t$;
   Assign PU i in user set $U^p$ if $\overline{w}_i^{min} < \hat{w}_i$, $i \in U^t$, and update $U^t$.
   Calculate $k = \arg \max \hat{p}_i$, $i \in U^t$.
   Calculate $\theta^{max}$, $\hat{w}_i^{max}$, and $\hat{p}_i^{max}$ by solving the PCM problem with $U^p = U^p \cup U^t \setminus k$; while $U^t$ is not empty do
     Calculate $\theta^*$, $\hat{w}_i$, and $\hat{p}_i$ by solving the PCM problem with $U^p = U^p \cup U^t$;

Calculate $\tau_i = \frac{\hat{p}_i}{\overline{w}_i^{min} - \hat{w}_i}$, $i \in U^t$;

Calculate $k = \arg \max \tau_i$, $i \in U^t$;
     if $\Sigma_{i \in U^p \cup U^t \setminus k} w_i^{min} + \Sigma_{i \in U^s \cup k} \overline{w}_i^{min} \leq W$ then
        Calculate $\theta^k$, $\hat{w}'_i$, and $\hat{p}'_i$ by solving the PCM problem with $U^p = U^p \cup U^t \setminus k$; if $\theta^k < \theta^*$ then
           Set primary user k in $U^s$, $\theta^* = \theta^k$, $\hat{w}_i = \hat{w}'_i$, and $\hat{p}_i = \hat{p}'_i$;
        else
           Set primary user k in $U^p$;
        end if
     else
        Set primary user k in $U^p$;
     end if
     Update $U^t = U^t \setminus k$;
   end while
end if
Return min $(\theta^{max}, \theta^*)$ and its according bandwith allocation.

---

Embodiments may be implemented via combinations of hardware and software components. The software components may include existing or new communication or signaling systems, proposed to communicate information to SBSs for allocating bandwidth. Moreover, embodiments are not limited to cellular phone systems, but may be implemented in any wireless network system that employs a cellular infrastructure with control communications between base stations.

While embodiments have been discussed above using specific examples, components, scenarios, and configurations in FIG. 1 and FIG. 2, they are intended to provide a general guideline to be used for implementing spectrum trading using cognitive radio techniques for energy savings in green-cognitive cellular networks. These examples do not constitute a limitation on the embodiments, which may be implements using other components, optimization schemes, and configurations using the principles described herein. For example, other algorithms may be implemented than those provided as example.

Figure 3:
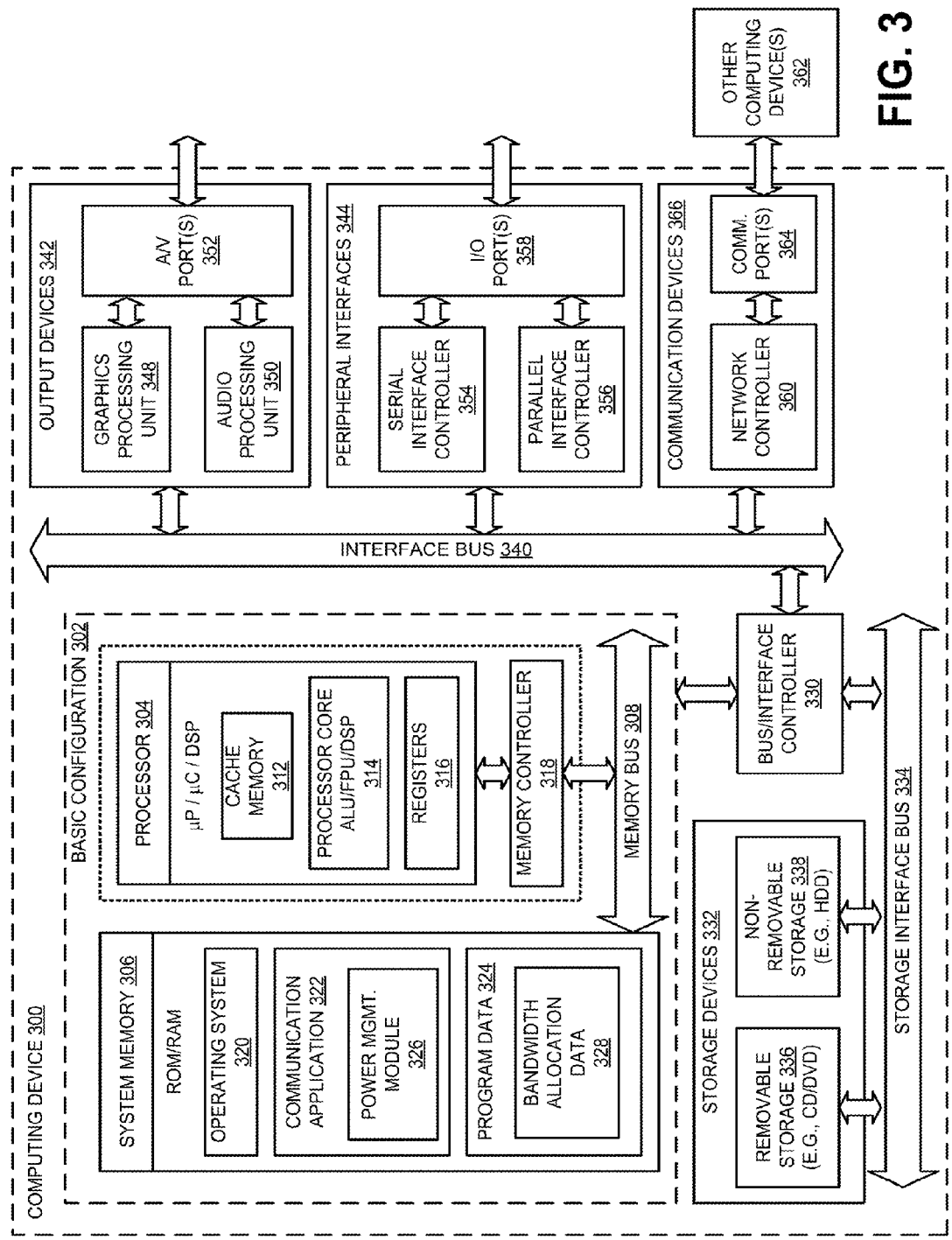
FIG. 3 illustrates a general purpose computing device, which may be used to implement spectrum trading using cognitive radio techniques for energy savings in green-cognitive cellular networks.

FIG. 3 illustrates a general purpose computing device, which may be used to implement spectrum trading using cognitive radio techniques for energy savings in green-cognitive cellular networks, arranged in accordance with at least some embodiments described herein. In a very basic configuration 302, computing device 300 typically includes one or more processors 304 and a system memory 306. A memory bus 308 may be used for communicating between processor 304 and system memory 306.

Depending on the desired configuration, processor 304 may be of any type including but not limited to a microprocessor (µP), a microcontroller (µC), a digital signal processor (DSP), or any combination thereof. Processor 304 may include one more levels of caching, such as a cache memory 312, a processor core 314, and registers 316. Example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more communication applications 322, and program data 324. Communication application 322 may include a power management module 326 that is arranged to reduce power consumption of a green-cognitive cellular network over a period of time using spectrum trading through cognitive radio techniques. Program data 324 may include one or more of bandwidth allocation data 328 and similar data as discussed above in conjunction with at least FIGS. 1 and 2. This data may be useful for optimizing power consumption as is described herein. This described basic configuration 302 is illustrated in FIG. 3 by those components within the inner dashed line.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 366) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 366 includes a network controller 360, which may be arranged to facilitate communications with one or more other computing devices 362 over a network communication link via one or more communication ports 364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a physical server, virtual server, a computing cloud, or a hybrid device that include any of the above functions. Computing device 300 may also be implemented as a personal computer including both laptop computer and non-laptop computer configurations. Moreover computing device 300 may be implemented as a networked system or as part of a general purpose or specialized server.

Networks for a networked system including computing device 300 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such as (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 4:
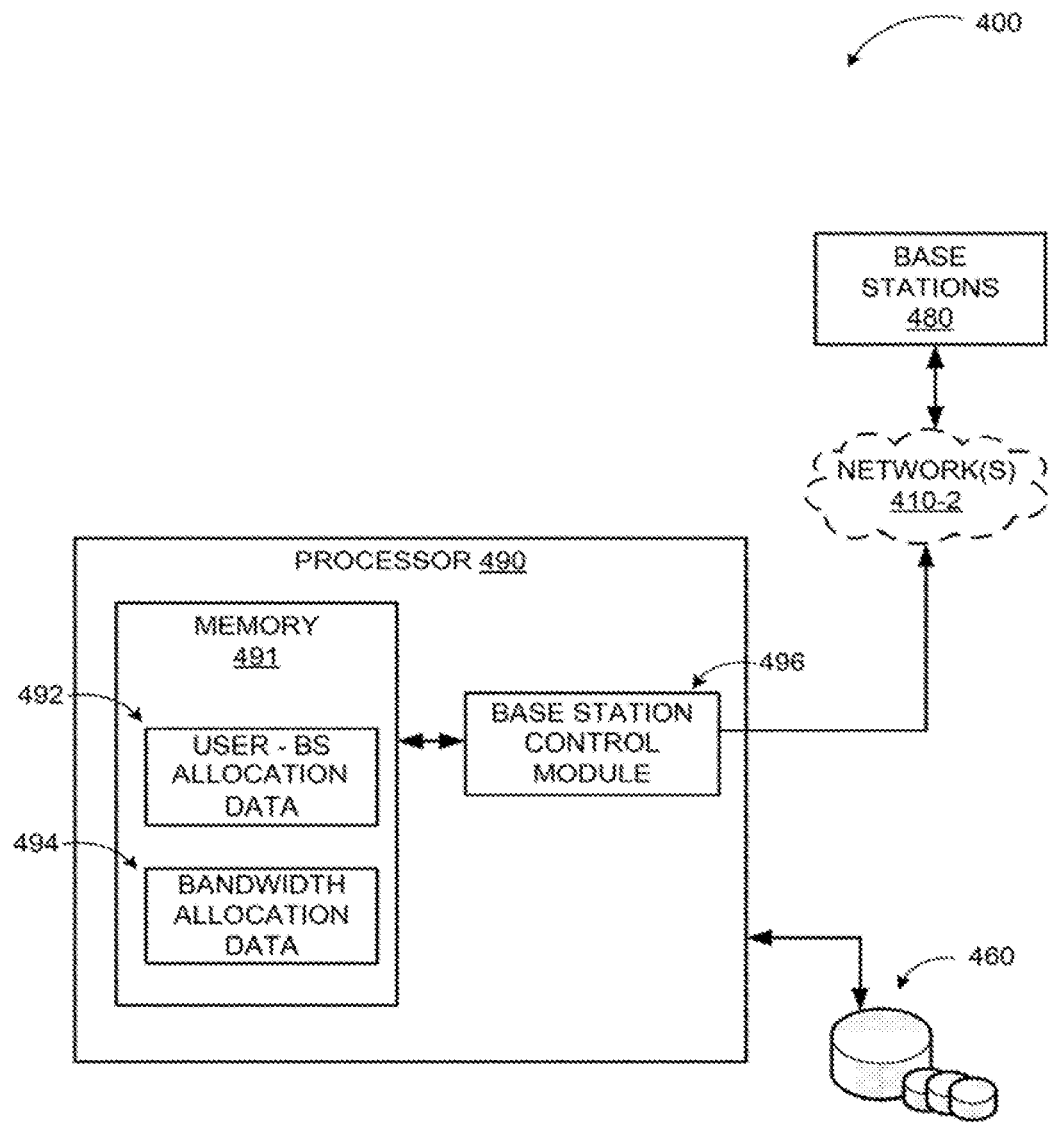
FIG. 4 illustrates a special purpose processor, which may be used to implement spectrum trading using cognitive radio techniques for energy savings in green-cognitive cellular networks.

FIG. 4 illustrates a special purpose processor, which may be used to implement spectrum trading using cognitive radio techniques for energy savings in green-cognitive cellular networks, arranged in accordance with at least some embodiments described herein.

Processor 490 in diagram 400 may be part of a computing device (e.g., a controller for the cellular network) that is communicatively coupled to one or more base stations 480, which may facilitate communication with end user devices through network(s) 410-2. Processor 490 may alternatively communicate with the base stations 480 over other networks such as wired networks, microwave networks, etc. Base stations 480 may include PBSs and SBSs, trading spectrum for energy savings. Processor 490 may store bandwidth allocation and power optimization related data at one or more data stores 460.

Processor 490 may include a number of processing modules such as base station control module 496. User—base station allocation data 492 and bandwidth allocation data 494 may be used by processor 490 in conjunction with base station control module 496 for allocating bandwidth from PBSs to SBSs and determining which PUs to associate with which PBS or SBSs. User—base station allocation data 492 and bandwidth allocation data 494 may be stored during processing in memory 491, which may be a cache memory of the processor 490 or in an external memory (e.g., memory external to processor 490). In some embodiments, processor 490 may also be implemented as part of a PBS.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
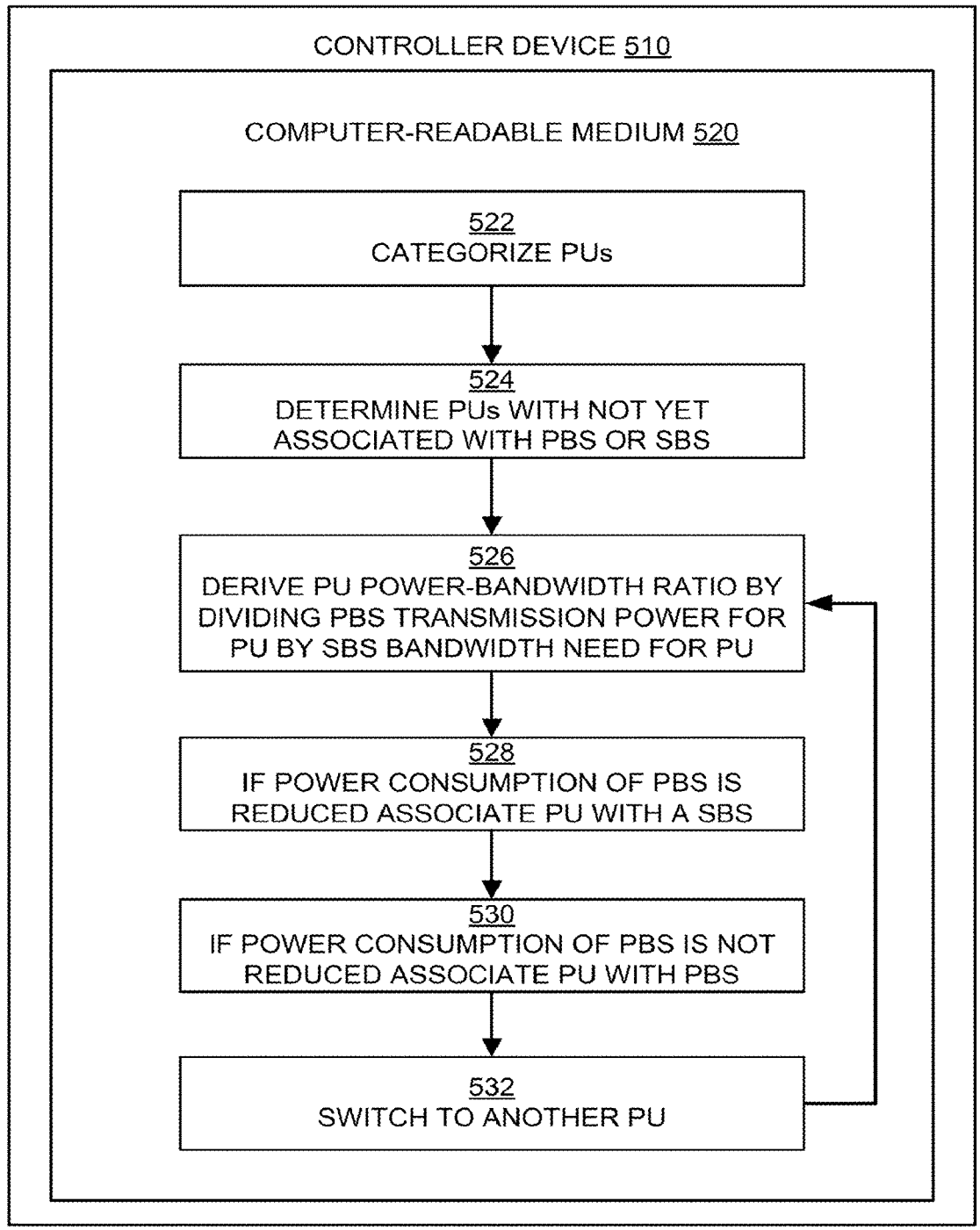
FIG. 5 is a flow diagram illustrating an example method for trading spectrum using cognitive radio techniques for energy savings in green-cognitive cellular networks that may be performed by a computing device such as the device in FIG. 3 or the special purpose processor in FIG. 4.

FIG. 5 is a flow diagram illustrating an example method for trading spectrum using cognitive radio techniques for energy savings in green-cognitive cellular networks that may be performed by a computing device such as the device in FIG. 3 or the special purpose processor in FIG. 4, arranged in accordance with at least some embodiments described herein.

Thus, controller device 510 may be embodied as computing device 300, special purpose processor 490, or similar devices executing instructions stored in computer-readable medium 520 for performing the method. A process of trading spectrum using cognitive radio techniques for energy savings in green-cognitive cellular networks may include one or more operations, functions or actions as is illustrated by one or more of blocks 522, 524, 526, 528, 530, and/or 532.

Some example processes may begin with operation 522, "CATEGORIZE PUs". At operation 522, a network controller such as processor 490 of FIG. 4 may categorize PUs into a first group that is associated with a PBS, a second group that is associated with the SBSs, and a third group that can be associated with either.

Operation 522 may be followed by operation 524, "DETERMINE PUs WITH NOT YET ASSOCIATED WITH PBS OR SBS." At operation 524, the processor 490 may select the third group of PUs for optimizing power consumption by associating PUs with PBS or SBSs with an aim of reduced power consumption while considering bandwidth allocations.

Operation 524 may be followed by operation 526, "DERIVE PU POWER-BANDWIDTH RATIO BY DIVIDING PBS TRANSMISSION POWER FOR PU BY SBS BANDWIDTH NEED FOR PU." At operation 526, the processor 490 may begin an iterative process of computing a power-bandwidth ratio for each PU in the third group based on a PBS transmission power needed to communicate with the PU and a bandwidth needed by an SBS to communicate with the PU.

Operation 526 may be followed by operation 528, "IF POWER CONSUMPTION OF PBS IS REDUCED ASSOCIATE PU WITH A SBS." At operation 528, the processor 490 may determine whether the power consumption for the PBS would be reduced is the PU is associated with the SBS. If the determination is affirmative, the PU may be associated with the SBS.

Operation 528 may be followed by operation 530, "IF POWER CONSUMPTION OF PBS IS NOT REDUCED ASSOCIATE PU WITH PBS." At operation 530, the processor 490 may associate the PU with the PBS if the power consumption for the PBS is not reduced by associating the PU with the SBS.

Operation 530 may be followed by operation 532, "SWITCH TO ANOTHER PU." At operation 532, the processor 490 may select another PU in the third group and continue the iterations returning to operation 526.

The operations included in the process of FIG. 5 described above are for illustration purposes. Trading spectrum using cognitive radio techniques for energy savings in green-cognitive cellular networks may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 6 illustrates a block diagram of an example computer program product for implementing spectrum trading using cognitive radio techniques for energy savings in green-cognitive cellular networks, arranged in accordance with at least some embodiments described herein.

In some examples, as shown in FIG. 6, computer program product 600 may include a signal bearing medium 602 that may also include machine readable instructions 604 that, when executed by, for example, a processor, may provide the functionality described above with respect to FIG. 1 through FIG. 4. Thus, for example, referring to processor 490, one or more of the tasks shown in FIG. 6 may be undertaken in response to instructions 604 conveyed to the processor 490 by signal bearing medium 602 to perform actions associated with optimizing cell traffic load and interference through high interference indicators as described herein. Some of those instructions may include categorizing PUs; determining PUs with not yet associated with PBS or SBS; deriving PU power-bandwidth ratio by dividing PBS transmission power for PU by SBS bandwidth need for PU; if power consumption of PBS is reduced associating PU with a SBS; if power consumption of PBS is not reduced associating PU with PBS; and switching to another PU as described previously.

In some implementations, signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to the processor 604 by an RF signal bearing medium 602, where the signal bearing medium 602 is conveyed by a wireless communications medium 610 (e.g., a wireless communications medium conforming with the IEEE 802.11 standard).

According to some examples, a method for reducing power consumption in cellular communication networks through spectrum trading is described. An example method may include determining a group of primary users (PUs) that are not associated with a primary base station (PBS) or a secondary base station (SBS); determining a power-bandwidth ratio for one of the PUs within the group by dividing a PBS transmission power needed to serve the PU by a bandwidth needed by a SBS to serve the PU; determining whether a power consumption of the PBS is reduced by having the PU associated with the SBS based on the power-bandwidth ratio; and if the power consumption is reduced associating the PU with the SBS, else associating the PU with the PBS.

According to other examples, the method may also include iteratively determining the power-bandwidth ratio for each PU within the group and associating each PU with one of the PBS and the SBS; categorizing PUs within a service area of the PBS into a first group of PUs associated with the PBS, a second group of PUs associated with the SBS, and a third group of PUs that are not associated with the PBS or the SBS; and/or categorizing the PUs based on a location and a QoS need of each PU. The PBS may be assigned a licensed spectrum to provide voice and data communications within a coverage area of the PBS and the SBS may be one a plurality of SBSs within the coverage area providing voice and data communications using unlicensed spectrum and a portion of the licensed spectrum allocated by the PBS.

According to further examples, the method may further include determining an allocation of the portion of the licensed spectrum to the SBS based on a number and QoS needs of PUs associated with the SBS; enabling the SBS to utilize a residual bandwidth of the allocated portion of the licensed spectrum to serve secondary users (SUs); and/or associating the PUs with one of the PBS and the SBS with an aim of maximizing a number of PUs offloaded to the SBS and minimizing an amount of bandwidth allocated to the SBS.

According to yet other examples, the method may include providing the SBS with bandwidth incentive to induce the SBS to provide data services to the PUs; modeling a power consumption of the PBS as a summation of a transmission power of the PBS toward the PUs that are associated with the PBS; modeling wireless channels for communicating with the PUs as slow-fading channels; and/or switching the PBS into a sleep mode, if all PUs are associated with the SBS.

According to other examples, a controller for a cellular communication network that reduces power consumption in the cellular communication network through spectrum trading is described. The controller may include a communication module configured to communicate with a plurality of primary base stations (PBSs) and secondary base stations (SBSs) and a power management module. The power management module may be configured to determine a group of primary users (PUs) that are not associated with a PBS or a SBS; determine a power-bandwidth ratio for one of the PUs within the group by dividing a PBS transmission power needed to serve the PU by a bandwidth needed by a SBS to serve the PU; determine whether a power consumption of the PBS is reduced by having the PU associated with the SBS based on the power-bandwidth ratio; if the power consumption is reduced, associate the PU with the SBS, else associate the PU with the PBS; and iteratively determine the power-bandwidth ratio for each PU within the group and associate each PU with one of the PBS and the SBS.

According to some examples, the power management module may be further configured to categorize PUs within a service area of the PBS into a first group of PUs associated with the PBS, a second group of PUs associated with the SBS, and a third group of PUs that are not associated with the PBS or the SBS and categorize the PUs based on a location and a QoS need of each PU. The PBS may be assigned a licensed spectrum to provide voice and data communications within a coverage area of the PBS and the SBS may be one a plurality of SBSs within the coverage area providing voice and data communications using unlicensed spectrum and a portion of the licensed spectrum allocated by the PBS.

According to further examples, the power management module may be further configured to determine an allocation of the portion of the licensed spectrum to the SBS based on a number and QoS needs of PUs associated with the SBS; enable the SBS to utilize a residual bandwidth of the allocated portion of the licensed spectrum to serve secondary users (SUs); associate the PUs with one of the PBS and the SBS with an aim of maximizing a number of PUs offloaded to the SBS and minimizing an amount of bandwidth allocated to the SBS; and/or provide the SBS with bandwidth incentive to induce the SBS to provide data services to the PUs.

According to yet other examples, the power management module may be further configured to model a power consumption of the PBS as a summation of a transmission power of the PBS toward the PUs that are associated with the PBS; model wireless channels for communicating with the PUs as slow-fading channels; and/or switch the PBS into a sleep mode, if all PUs are associated with the SBS. The controller may be integrated into one of a central network server and a PBS.

According to further examples, a cellular-structured wireless communication network capable of reducing power consumption in the cellular communication network through spectrum trading is described. The network may include a plurality of primary base stations (PBSs) and secondary base stations (SBSs) and a controller managing communication and power management operations of the base stations. The controller may be configured to determine a group of primary users (PUs) that are not associated with a PBS or a SBS; determine a power-bandwidth ratio for one of the PUs within the group by dividing a PBS transmission power needed to serve the PU by a bandwidth needed by a SBS to serve the PU; determine whether a power consumption of the PBS is reduced by having the PU associated with the SBS based on the power-bandwidth ratio; if the power consumption is reduced, associate the PU with the SBS, else associate the PU with the PBS; and iteratively determine the power-bandwidth ratio for each PU within the group and associate each PU with one of the PBS and the SBS.

According to some examples, the controller may be further configured to categorize PUs within a service area of the PBS into a first group of PUs associated with the PBS, a second group of PUs associated with the SBS, and a third group of PUs that are not associated with the PBS or the SBS and categorize the PUs based on a location and a QoS need of each PU. The PBS may be assigned a licensed spectrum to provide voice and data communications within a coverage area of the PBS and the SBS may be one a plurality of SBSs within the coverage area providing voice and data communications using unlicensed spectrum and a portion of the licensed spectrum allocated by the PBS.

According to other examples, the controller may be further configured to determine an allocation of the portion of the licensed spectrum to the SBS based on a number and QoS needs of PUs associated with the SBS; enable the SBS to utilize a residual bandwidth of the allocated portion of the licensed spectrum to serve secondary users (SUs); associate the PUs with one of the PBS and the SBS with an aim of maximizing a number of PUs offloaded to the SBS and minimizing an amount of bandwidth allocated to the SBS; and/or provide the SBS with bandwidth incentive to induce the SBS to provide data services to the PUs.

According to yet other examples, the controller may be further configured to model a power consumption of the PBS as a summation of a transmission power of the PBS toward the PUs that are associated with the PBS; model wireless channels for communicating with the PUs as slow-fading channels; and/or switch the PBS into a sleep mode, if all PUs are associated with the SBS. The controller may be integrated into one of a central network server and a PBS.

According to some examples a computer-readable storage medium with instructions stored thereon for reducing power consumption in cellular communication networks through spectrum trading is described. The instructions may cause a method to be performed when executed, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to reduce power consumption in cellular communication networks through spectrum trading, the method comprising:
    determining a group of primary users (PUs) that are not associated with a primary base station (PBS) or a secondary base station (SBS);
    determining a PBS transmission power to serve a PU within the group;
    determining a bandwidth to be used by the SBS to serve the PU;
    deriving a power-bandwidth ratio for the PU by dividing the PBS transmission power to serve the PU by the bandwidth to be used by the SBS to serve the PU;
    determining whether a power consumption of the PBS is reduced by having the PU associated with the SBS based on the power-bandwidth ratio; and
    if the power consumption is reduced, associating the PU with the SBS, else associating the PU with the PBS.

2. The method according to claim 1, further comprising: categorizing PUs within a service area of the PBS into a first group of PUs associated with the PBS, a second group of PUs associated with the SBS, and a third group of PUs that are not associated with the PBS or the SBS.

3. The method according to claim 2, further comprising: categorizing the PUs based on a location and a QoS need of each PU.

4. The method according to claim 1, wherein the PBS is assigned a licensed spectrum to provide voice and data communications within a coverage area of the PBS, and wherein the SBS comprises one of a plurality of SBSs within the coverage area that provide voice and data communications using an unlicensed spectrum and a portion of the licensed spectrum allocated by the PBS.

5. The method according to claim 4, further comprising: determining an allocation of the portion of the licensed spectrum to the SBS based on a number of PUs associated with the SBS and QoS needs of the PUs associated with the SBS.

6. The method according to claim 1, further comprising: associating the PUs with one of the PBS and the SBS to increase a number of PUs offloaded to the SBS and to reduce an amount of bandwidth allocated to the SBS.

7. The method according to claim 1, further comprising: modeling a power consumption of the PBS based on adding a transmission power of the PBS to serve each PU that is associated with the PBS.

8. The method according to claim 1, further comprising: switching the PBS into a sleep mode, if all PUs are associated with the SBS.

9. A controller for a cellular communication network and configured to reduce power consumption in the cellular communication network through spectrum trading, the controller comprising:
    a communication module configured to communicate with a plurality of primary base stations (PBSs) and secondary base stations (SBSs); and
    a power management module configured to:
        determine a group of primary users (PUs) that are not associated with a PBS or a SBS;
        determine a PBS transmission power to serve a PU within the group;
        determine a bandwidth to be used by the SBS to serve the PU;
        derive a power-bandwidth ratio for the PU by division of the PBS transmission power to serve the PU by the bandwidth to be used by the SBS to serve the PU;
        determine whether a power consumption of the PBS is reduced by having the PU associated with the SBS based on the power-bandwidth ratio;
        if the power consumption is reduced, associate the PU with the SBS, else associate the PU with the PBS; and
        iteratively determine the power-bandwidth ratio for each PU within the group and associate each PU with one of the PBS and the SBS.

10. The controller according to claim 9, wherein the power management module is further configured to:
    categorize PUs within a service area of the PBS into a first group of PUs associated with the PBS, a second group of PUs associated with the SBS, and a third group of PUs that are not associated with the PBS or the SBS.

11. The controller according to claim 9, wherein the PBS is assigned a licensed spectrum to provide voice and data communications within a coverage area of the PBS, wherein the SBS comprises one of a plurality of SBSs within the coverage area that provide voice and data communications through an unlicensed spectrum and a portion of the licensed spectrum allocated by the PBS.

12. The controller according to claim 11, wherein the power management module is further configured to:
    enable the SBS to utilize a residual bandwidth of the allocated portion of the licensed spectrum to serve secondary users (SUs).

13. The controller according to claim 9, wherein the power management module is configured to:
    associate the PUs with one of the PBS and the SBS to increase a number of PUs offloaded to the SBS and to reduce an amount of bandwidth allocated to the SBS.

14. The controller according to claim 9, wherein the power management module is further configured to:
provide the SBS with bandwidth incentive to induce the SBS to provide data services to the PUs.

15. The controller according to claim 9, wherein the controller is integrated into one of a central network server and a PBS.

16. A cellular-structured wireless communication network capable to reduce power consumption in the cellular communication network through spectrum trading, the network comprising:
a plurality of primary base stations (PBSs) and secondary base stations (SBSs); and
a controller configured to manage communication and power management operations of the PBSs and SBSs, the controller configured to:
determine a group of primary users (PUs) that are not associated with a PBS or a SBS;
determine a PBS transmission power to serve a PU within the group;
determine a bandwidth to be used by the SBS to serve the PU;
derive a power-bandwidth ratio for the PU by division of the PBS transmission power to serve the PU by the bandwidth to be used by the SBS to serve the PU;
determine whether a power consumption of the PBS is reduced by having the PU associated with the SBS based on the power-bandwidth ratio;
if the power consumption is reduced, associate the PU with the SBS, else associate the PU with the PBS; and
iteratively determine the power-bandwidth ratio for each PU within the group and associate each PU with one of the PBS and the SBS.

17. The cellular-structured wireless communication network according to claim 16, wherein the controller is further configured to:
categorize the PUs based on a location and a QoS need of each PU.

18. The cellular-structured wireless communications network according to claim 16, wherein the PBS is assigned a licensed spectrum to provide voice and data communications within a coverage area of the PBS, wherein the SBS comprises one of a plurality of SBSs within the coverage area that provide voice and data communications using an unlicensed spectrum and a portion of the licensed spectrum allocated by the PBS.

19. The cellular-structured wireless communication network according to claim 18, wherein the controller is further configured to:
enable the SBS to utilize a residual bandwidth of the allocated portion of the licensed spectrum to serve secondary users (SUs).

20. The cellular-structured wireless communication network according to claim 16, wherein the controller is configured to:
associate the PUs with one of the PBS and the SBS to increase a number of PUs offloaded to the SBS and to reduce an amount of bandwidth allocated to the SBS.

21. The cellular-structured wireless communication network according to claim 16, wherein the controller is further configured to:
model a power consumption of the PBS based on adding a transmission power of the PBS to serve each PU that is associated with the PBS.

22. The cellular-structured wireless communication network according to claim 16, wherein the controller is further configured to:
model wireless channels to communicate with the PUs as slow-fading channels.

23. The cellular-structured wireless communication network according to claim 16, wherein the controller is further configured to:
switch the PBS into a sleep mode, if all PUs are associated with the SBS.

* * * * *

UNITED STATES PATENT AND TRADEMARK OFFICE
CERTIFICATE OF CORRECTION

PATENT NO. : 9,516,589 B2
APPLICATION NO. : 14/110708
DATED : December 6, 2016
INVENTOR(S) : Ansari et al.

It is certified that error appears in the above-identified patent and that said Letters Patent is hereby corrected as shown below:

In Column 1, Lines 5-20, delete
"STATEMENT REGARDING FEDERALLY SPONSORED RESEARCH OR DEVELOPMENT
This invention was made with government support under grants CNS-1147602 awarded by the National Science Foundation. The government has certain rights in the invention.

CROSS-REFERENCE TO RELATED APPLICATION
This application is the U.S. National Stage filing under 35 U.S.C. §371 of International Application No. PCT/US2013/34848 filed on Apr. 1, 2013. The International Application is hereby incorporated by reference in its entirety."

and insert
--CROSS-REFERENCE TO RELATED APPLICATION
This application is the U.S. National Stage filing under 35 U.S.C. §371 of International Application No. PCT/US2013/34848 filed on Apr. 1, 2013. The International Application is hereby incorporated by reference in its entirety.

STATEMENT REGARDING FEDERALLY SPONSORED RESEARCH OR DEVELOPMENT
This invention was made with government support under grants CNS-1147602 awarded by the National Science Foundation. The government has certain rights in the invention.--, therefor.

In Column 13, Line 41, delete "bandwith" and insert -- bandwidth --, therefor.

In Column 26, Line 1, in Claim 18, delete "communications" and insert -- communication --, therefor.

Signed and Sealed this
Eighteenth Day of April, 2017

Michelle K. Lee
*Director of the United States Patent and Trademark Office*